(12) United States Patent
Kim et al.

(10) Patent No.: US 7,626,810 B1
(45) Date of Patent: Dec. 1, 2009

(54) APPARATUS AND METHOD FOR INHIBITING HIGH-FREQUENCY, ELECTROMAGNETIC INTERFERENCE FROM NON-METALLIC HARD DISK DRIVE CARRIERS

(75) Inventors: Ben Kim, Sunnyvale, CA (US); Tony Loo, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 223 days.

(21) Appl. No.: 11/805,628

(22) Filed: May 24, 2007

(51) Int. Cl.
*G06F 1/16* (2006.01)
(52) U.S. Cl. .............................. 361/679.33
(58) Field of Classification Search .............. 361/685
See application file for complete search history.

(56) References Cited

U.S. PATENT DOCUMENTS

| | | | | |
|---|---|---|---|---|
| 5,673,171 A | * | 9/1997 | Varghese et al. | 361/685 |
| 6,084,768 A | * | 7/2000 | Bolognia | 361/685 |
| 6,088,221 A | * | 7/2000 | Bolognia | 361/685 |
| 6,325,353 B1 | * | 12/2001 | Jiang | 361/685 |
| 6,373,696 B1 | * | 4/2002 | Bolognia et al. | 361/685 |
| 6,421,236 B1 | * | 7/2002 | Montoya et al. | 361/685 |

* cited by examiner

*Primary Examiner*—Lisa Lea-Edmonds
(74) *Attorney, Agent, or Firm*—John R. Ley

(57) ABSTRACT

A high-frequency energy absorbing member is used with a disk drive carrier to attenuate high-frequency electromagnetic radiation emitted from a hard disk drive housed within the disk drive carrier. The use of the high-frequency energy absorbing member allows various other components of the disk drive carrier to be manufactured from less expensive materials which are ineffective at attenuating high-frequency electromagnetic radiation.

25 Claims, 8 Drawing Sheets

APPARATUS AND METHOD FOR INHIBITING HIGH-FREQUENCY, ELECTROMAGNETIC INTERFERENCE FROM NON-METALLIC HARD DISK DRIVE CARRIERS

This invention relates to disk drive carriers which are used to house hard disk drives within large computer systems, and more specifically, to a new and improved apparatus and method which inhibits and reduces electromagnetic interference emanated from hard disk drives contained within disk drive carriers manufactured from less-expensive, non-metallic materials.

BACKGROUND OF THE INVENTION

One problem associated with some electronic devices is the undesirable production of high-frequency electromagnetic radiation which can interfere with the proper operation of other electronic equipment. Such electromagnetic radiation is known as electromagnetic interference ("EMI"). To ensure that electronic devices do not emit excessive amounts of EMI so as to interfere with the operation of other adjacent electronic devices, the United States Federal Communications Commission has promulgated regulations which limit the amount of EMI that can be emitted from many electronic devices. Electronic devices which do not comply with the FCC regulations cannot be legally sold in the United States. The governments of many other countries have similar regulations.

Most of today's digital computer equipment operates at switching frequencies which generate electromagnetic radiation that can lead to EMI. One such example includes high-speed disk drives with data transfer rates of at least 1 Gigabit per second ("Gbps"). In addition to producing electromagnetic radiation at the frequency of the data transfer rate, harmonic frequencies are also produced. Thus, for a high-speed disk drive whose integrated data input/output circuitry operates at a data transfer rate of 4.25 Gbps, the EMI includes significant components at a fundamental frequency of 4.25 GHz and its clock harmonic frequencies of up to 8.5 GHz.

Since the switching frequency of hard disk drives cannot be reduced and still obtain high performance, the most practical and feasible solution to the problem of the emitted EMI is to contain that EMI. One method for containing undesirable electromagnetic radiation is to use an EMI shield (or Faraday cage). The EMI shield encloses the electronic device which produces the undesirable electromagnetic radiation and prevents the EMI from propagating beyond the enclosure. A typical EMI shield is made of a metallic material which blocks the direct passage or propagation of the undesirable electromagnetic radiation. The EMI shield attenuates the EMI to reduce its strength and/or prevent it from escaping into the immediate environment to interact with adjacent electronic devices and interfere with their proper operation.

Effective EMI shields are typically created from a material which is highly conductive of electromagnetic radiation. For high-speed hard disk drives, the hard disk drive is enclosed within a disk drive carrier device that is made almost entirely from metal. The metal becomes the EMI shield to attenuate and contain the emitted EMI.

Although metal disk drive carriers are effective in containing and suppressing the EMI, the use of metal in the carrier device increases its manufacturing cost. Constructing the disk drive carrier from less-expensive, non-metallic materials, such as plastic, fails to block the emitted electromagnetic radiation sufficiently to the achieve an acceptable level of EMI established by applicable governmental regulations.

SUMMARY OF THE INVENTION

The present invention allows a disk drive carrier to be manufactured in significant part from less-expensive, non-metallic materials such as plastic while still obtaining a capability from the disk drive carrier to attenuate high-frequency electromagnetic radiation and electromagnetic interference (EMI) emitted by a hard disk drive housed within the disk drive carrier. The disk drive carrier includes a high-frequency energy absorbing member to attenuate the high-frequency electromagnetic radiation and EMI emitted from the hard disk drive, thereby preventing that emitted EMI from otherwise escaping into the adjoining environment. Using the high-frequency energy absorbing member allows certain components of the disk drive carrier to be manufactured from the less-expensive, non-metallic materials while still meeting the requirements and limits for emitted EMI set by governmental regulations.

In accordance with these and other features, one aspect of the invention involves a disk drive carrier which houses a hard disk drive and which has improved shielding for electromagnetic interference (EMI) emitted by the hard disk drive. The disk drive carrier includes a disk drive tray, a handle, and a handle housing. The disk drive tray receives the hard disk drive within the disk drive carrier, and the handle and the handle housing are connected to a front side of the disk drive tray. The handle is pivotally connected to the handle housing for moving the disk drive carrier into and out of a position in which the disk drive carrier is normally retained during use. The handle and the handle housing are formed substantially of material which is substantially incapable of absorbing electromagnetic radiation. The disk drive carrier further includes a high-frequency energy absorbing member secured to the disk drive carrier, and the high-frequency energy absorbing member absorbs EMI leaked through spring fingers near the handle housing. The high-frequency energy absorbing member includes a strip of silicon ferrite attached to the handle housing, or a layer of metal, such as nickel-zinc alloy, attached to the handle housing.

Another aspect of the invention relates to a method of reducing electromagnetic interference (EMI) emitted from hard disk drives housed within disk drive carriers in use positions on a disk storage shelf. The method involves using disk drive carriers, and each of the disk drive carriers has a disk drive tray for housing a hard disk drive, a handle housing, and a handle. Each handle housing is connected to a front side of the disk drive tray, and each handle is pivotally connected to the handle housing for moving the disk drive carrier into and out of a position in which the disk drive carrier is normally retained during use on the disk storage shelf. The handles and handle housings are formed substantially of material, such as plastic, which is substantially incapable of dissipating high-frequency energy. The method additionally involves locating a high-frequency energy absorbing member at the handle housing to absorb the EMI leaked from the disk drive through spring fingers located near the plastic handle housing. The high-frequency energy absorbing member includes a strip of silicon ferrite, or a layer of metal, such as a nickel-zinc alloy. In a further aspect of the invention, the method involves the filling of the use positions of the disk shelf with disk drive carriers without regard to whether hard disk drives are housed in the disk drive trays of those carriers.

A more complete appreciation of the present disclosure and its scope, and the manner in which it achieves the above and other improvements, can be obtained by reference to the following detailed description of presently preferred embodiments taken in connection with the accompanying drawings, which are briefly summarized below, and the appended claims.

DETAILED DESCRIPTION

Figure 1:
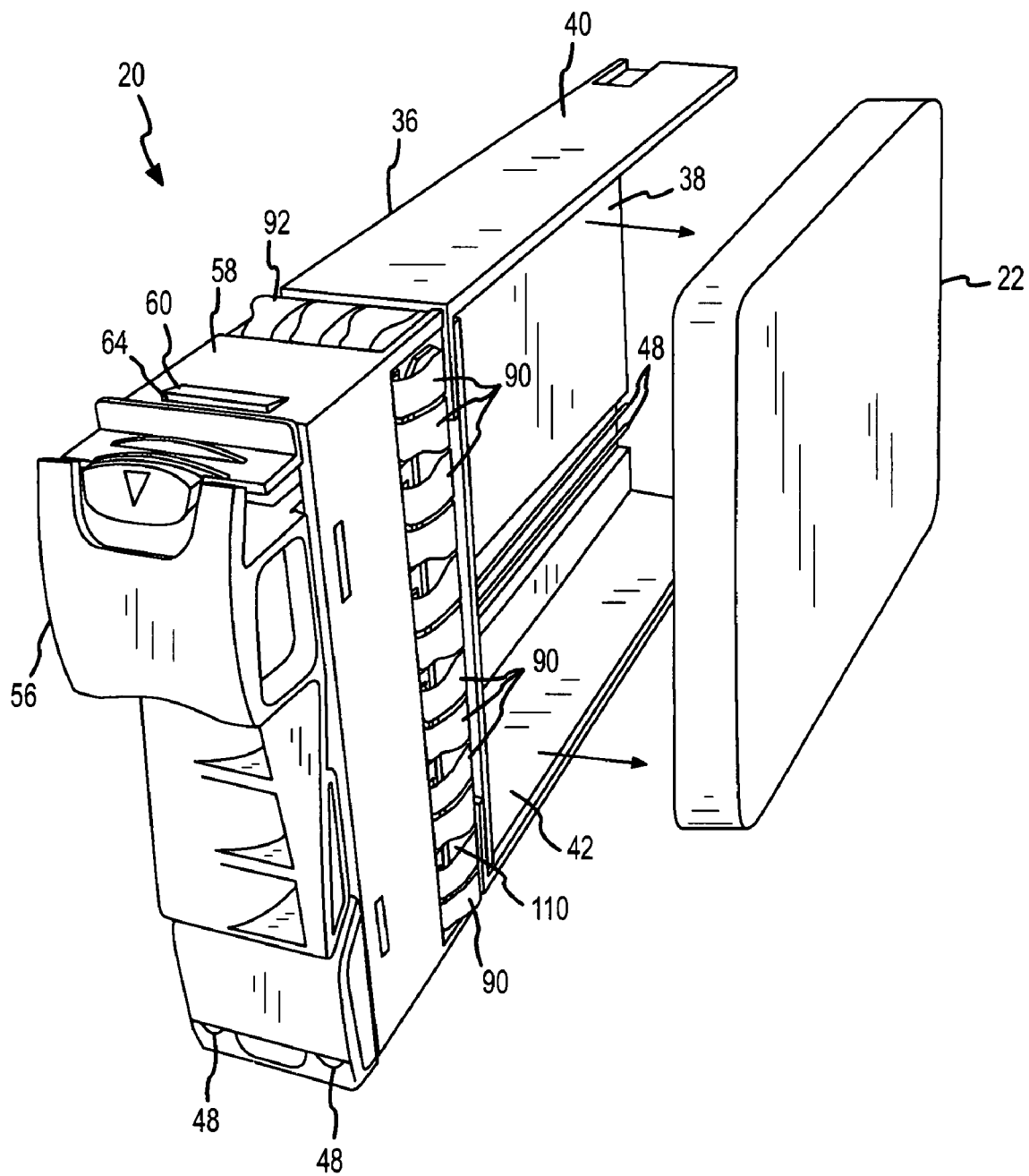
FIG. 1 is a perspective view of a disk drive carrier which incorporates the present invention and a hard disk drive shown exploded from the disk drive carrier.

A disk drive carrier 20 which embodies the present invention is shown in FIG. 1. The disk drive carrier 20 attenuates undesirable electromagnetic radiation emitted by a hard disk drive 22 that is enclosed or housed and retained within the disk carrier 20. A plurality of disk drive carriers 20, each enclosing its own hard disk drive 22, are typically supported side-by-side in a disk storage shelf 24, shown in FIG. 2. A plurality of disk storage shelves 24 are typically stacked in vertical columns in a support rack (not shown) in mass data storage computer systems, such as that one 26 generally shown in FIG. 3. Retaining each hard disk drive 22 in its own disk drive carrier 20, and locating a plurality of disk drive carriers 20 in a disk storage shelf 24 and retaining the plurality of disk storage shelves 24 in support racks, makes it convenient to access each of the hard disk drives whenever necessary for service or replacement.

Figure 3:
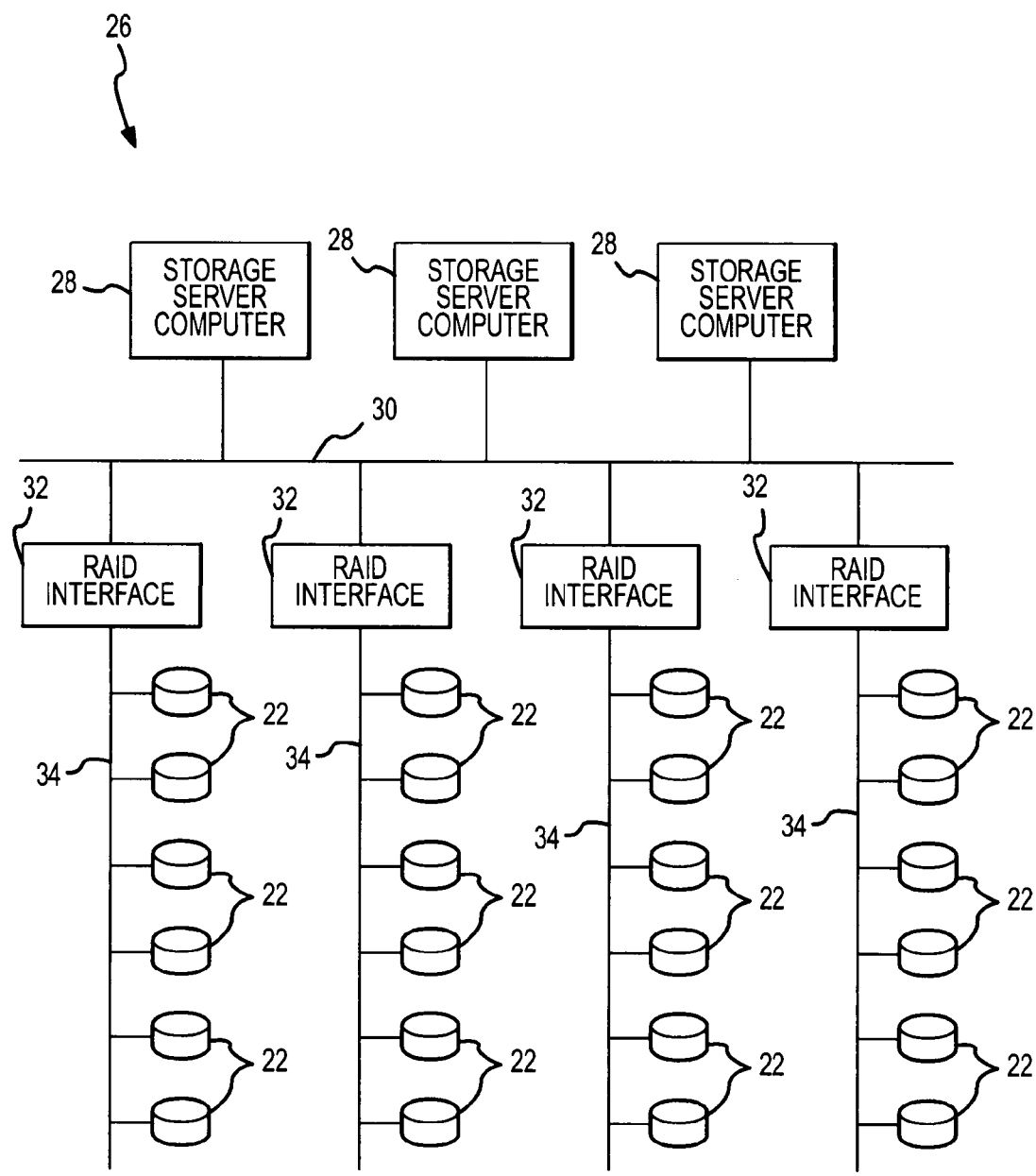
FIG. 3 is a block diagram of a network storage computer system which employs a plurality of hard disk drives housed within disk drive carriers supported on disk storage shelves in the manner illustrated by FIG. 2.

The network storage computer system 26 shown in FIG. 3 includes at least one, and preferably a plurality, of storage server computers 28, each of which executes a mass storage operating system for managing the storage and retrieval of large amounts of data. The data is stored on the plurality of hard disk drives 22. Typically, the plurality of hard disk drives are organized in the well-known configuration of a redundant array of independent (or inexpensive) disks (a "RAID" configuration). The RAID configuration of hard disk drives 22 secures advantages in redundancy to allow copies of data to be accessed or reconstructed in the event of an unanticipated failure in which the original data cannot be accessed or is lost. A bus 30 connects the storage server computers 28 with RAID interfaces 32. A separate bus 34 connects each of the hard disk drives 22 to each RAID interface 32. The buses 30 and 34 communicate data between the storage server computers 28 and the hard disk drives 22 through the RAID interfaces 32. One supplier of network storage computer systems is Network Appliance, Inc. of Sunnyvale, Calif., which uses a mass data storage operating system on the storage server computers 28 known as Data ONTAP®. However, the present invention may be used with any type of network storage computer system, disk storage shelf, or disk drive carrier.

Figure 2:
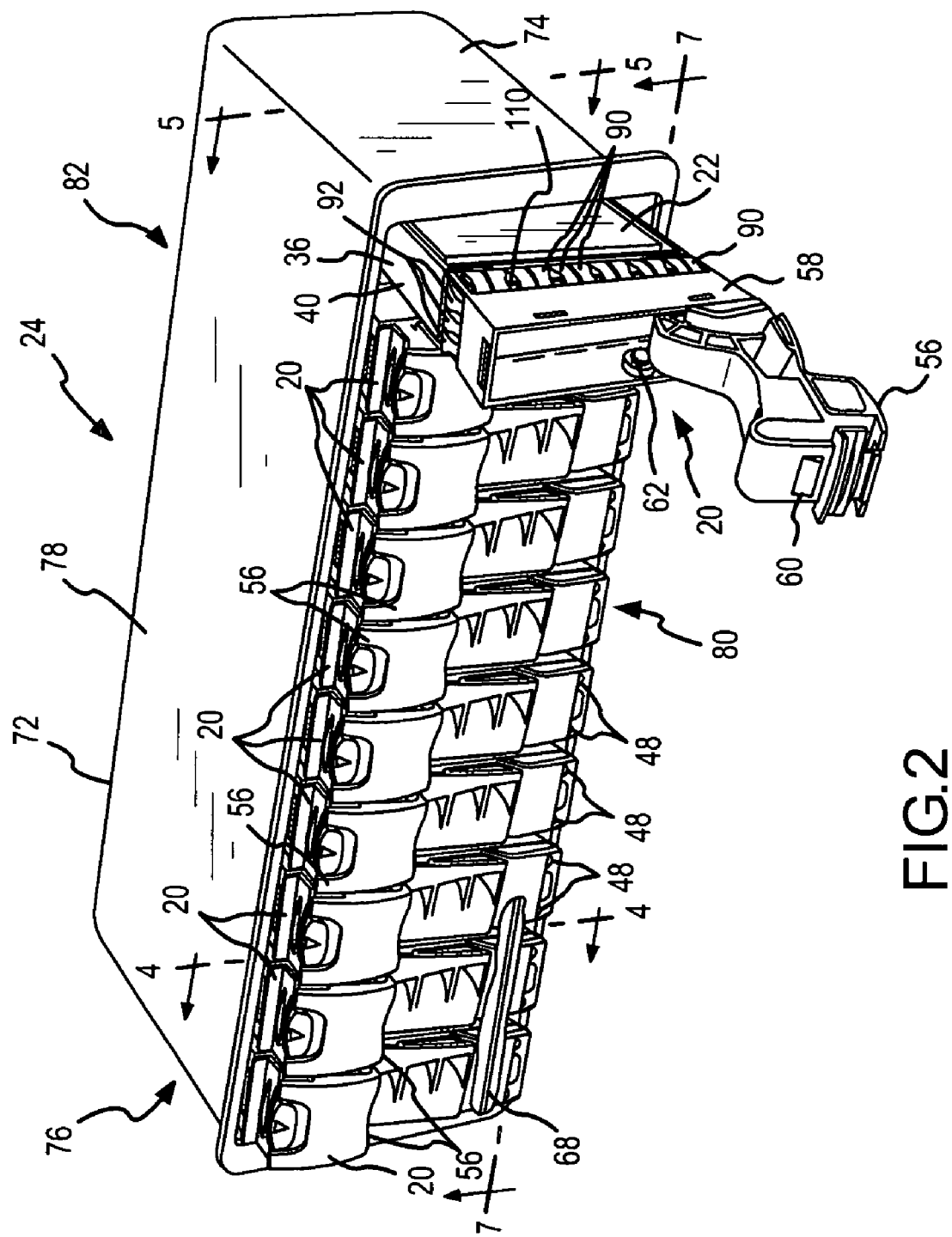
FIG. 2 is a perspective view of a disk storage shelf which supports the disk drive carrier and the hard disk drive shown in FIG. 1.

In the disk storage shelf 24 shown in FIG. 2, each disk drive carrier 20 occupies a position or slot within the disk storage shelf 24. Each disk drive carrier 20 is selectively removable from and insertable into the slot within the disk storage shelf unit 24. Each of the disk drive carriers 20 are structurally identical to each other. If the data storage requirements of the particular application do not require the use of the maximum number of the disk drives 22 that can be supported by the disk storage shelf 24, disk drive carriers nevertheless occupy all of the slots of the disk storage shelf 24 but hard disk drives 22 are not enclosed in some of the disk drive carriers 20.

Details of the disk drive carrier 20 are shown in FIGS. 1 and 4-10. The disk drive carrier 20 comprises a disk drive tray 36 located generally at the rear portion of the disk drive carrier 20. The disk drive tray 36 holds the hard disk drive 22 in a fixed position within the carrier 20. The tray 36 includes a first vertical side 38, top and bottom transverse sides 40 and 42 and a front side 44. The disk drive is located between the vertical, top, bottom and front sides 38-44. Aligned ventilation holes 46 in the front side 44 allow air to ventilate and cool the hard disk drive 22. Lightpipes 48 run longitudinally along the length of the tray 36 and are used to conduct light signals which indicate the status of the operation of the hard disk drive 22. The two lightpipes 48 terminate at a position on a face of the disk drive carrier 20 where the light signals conducted can be viewed.

Figure 4:
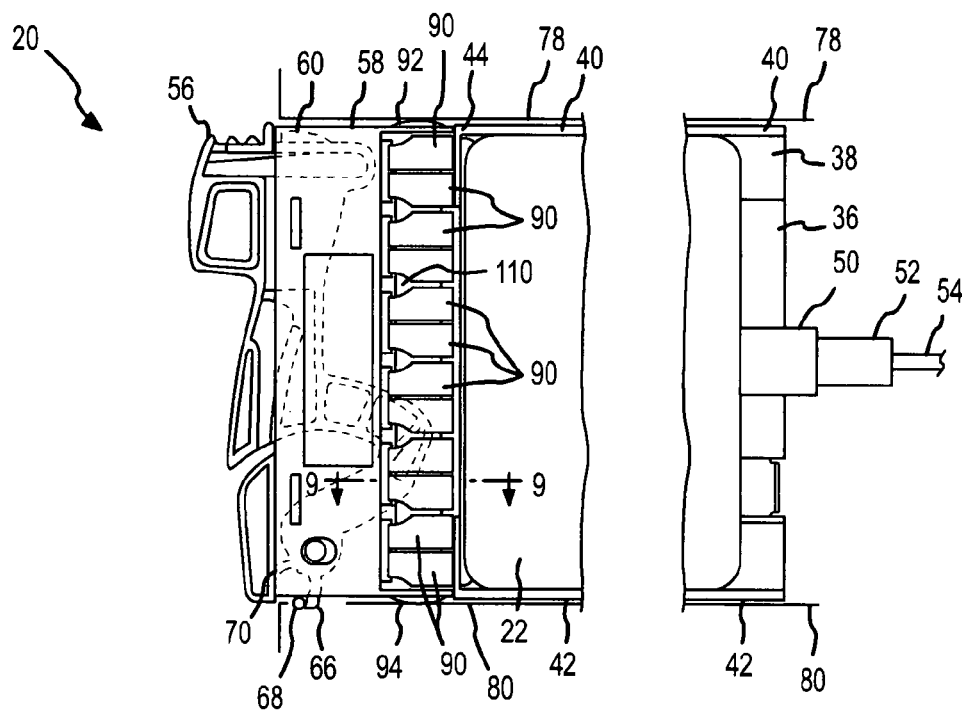
FIG. 4 is a vertical cross-sectional view of the disk storage shelf shown in FIG. 2, taken substantially in the plane 4-4 in FIG. 2, showing the disk drive carrier and the hard disk drive supported therein in a vertical side elevational view.

With the disk drive 22 positioned in the tray 36, the insertion of the disk drive carrier 20 in one of the slots of the disk storage shelf 24 permits a disk drive interface connector 50 on the rear side of the hard disk drive 22 to be electrically connected to a backplane interface connector 52 attached to the disk storage shelf 20, as shown in FIG. 4. A cable 54 leads from the connector 52 to the bus 34 (FIG. 3), or alternatively, the use of a cable can be eliminated when the connector 52 is directly mounted on a backplane printed circuit board (not shown) which is communicatively connected to the bus 34. In this manner, the insertion of a disk drive carrier 20 into a disk storage shelf 24 permits another hard disk drive to be connected to the bus 34 (FIG. 3). Conversely, the removal of a disk drive carrier 20 from the disk storage shelf 24 permits disconnection of the hard disk drive 22 from the bus 34 (FIG. 3).

Figure 5:
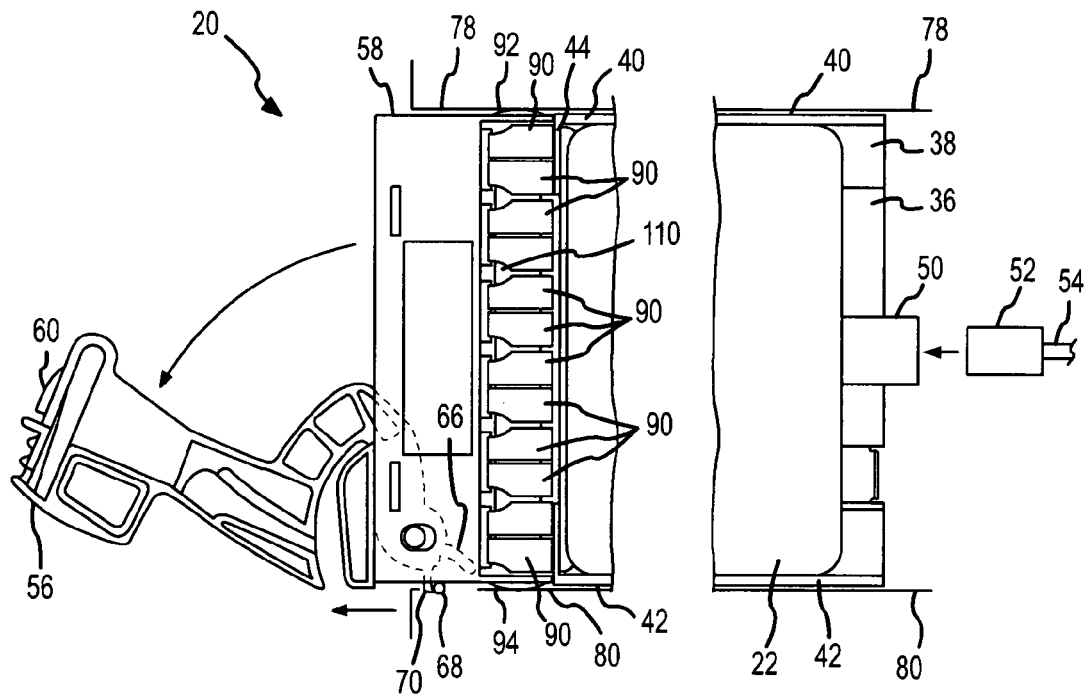
FIG. 5 is a view similar to that shown in FIG. 4, illustrating removal of the disk drive carrier from the disk shelf by pivoting movement of a handle of the disk drive carrier.

Each disk drive carrier 20 is retained within and removed from a slot in the disk storage shelf 24 by movement of a handle 56 located at a front end of the disk drive carrier 20, as shown in FIG. 5. The handle 56 is pivotally attached to a handle housing 58, and the handle housing 58 is attached to the front side 44 of the hard drive tray 36. The handle 56 engages the handle housing 58 with a latch 60 which maintains the handle 56 in an up or closed position. Upon the latch 60 disengaging from the handle housing 58, a gearing mechanism 62 (FIGS. 6 and 8) assists the handle 56 to move to the down or open position (FIG. 5). The latch 60 is located at the outer, free and non-pivotally connected end of the handle 56. When the handle 56 is in the closed position (FIG. 4), the latch 60 engages with a slot 64 formed in the handle housing 58 to hold and maintain the hard disk drive 22 connected through the connectors 50 and 52 to the bus 34 (FIG. 3). When the latch 60 is depressed to withdraw from the slot 64, the handle 56 is free to pivot to an open position (FIG. 5), allowing the disk drive carrier 20 to be removed from the disk storage shelf 24 (FIG. 2).

A stationary hook 66 extends from the handle 56 and engages a shelf rod 68 which extends transversely along the bottom front edge of the disk storage shelf 24, as shown in FIG. 4. The stationary hook 66 engages the shelf rod 68 to prevent the forward movement of the disk drive carrier 20 when the handle is in the closed and latched position. When the handle 56 is pulled downward, a torque hook 70 engages the shelf rod 68, as shown in FIG. 5, and the engagement of the torque hook 70 against the shelf rod 68 forces the disk drive carrier 20 forward out of the slot in the disk storage shelf 24.

The integrated input/output circuitry of the hard disk drive 22 operates at a high data transfer frequency to efficiently transfer data over the bus 30 (FIG. 3). The high data transfer frequency of the integrated I/O circuitry of the hard disk drive 22 inherently creates high-frequency electromagnetic radiation that is capable of interfering with the operation of nearby electronic devices. Accordingly it is necessary to shield each hard disk drive 22, and the collection of all of the hard disk drives 22 in the disk storage shelf 24 in order to comply with governmental regulations concerning the emission of electromagnetic radiation that constitutes electromagnetic interference (EMI).

The tray 36 is made of or stamped from conductive metal. The metal tray 36 forms an electromagnetic shield to confine the electromagnetic radiation emitted from the hard disk drive 22 at the sides 38, 40 and 42 and partially from the apertures in the front side 44 of the tray 36. The handle housing 58, which was previously made from metal, provides an electromagnetic shield for that radiation which escapes through the ventilation holes 46 in the front side 44 of the tray 36.

The disk storage shelf 24 also forms an electromagnetic shield to confine the electromagnetic radiation emitted from the hard disk drives 22 in the disk drive carriers 20 located within the disk storage shelf 24. The disk storage shelf 24 is formed from a housing 72 which includes a first lateral side 74, a second lateral side 76, a top side 78, a bottom side 80 and a back side 82 (FIG. 2). The sides 74-82 are formed of electrically conductive material, typically metal. The conductive sides 74-82 form the electromagnetic shield. The conductive side 38 of the metal tray 36 of each neighboring disk drive carrier 20 adjoins the hard disk drive 22 in the disk storage shelf 24 and provides an electromagnetic shield for much of the electromagnetic radiation from the open side of the tray 36 of the adjacent disk drive carrier 20.

A conduction unit 84 is attached between the handle housing 58 and the front end side 44 of the tray 36. The handle housing 58 is connected to the front side 44 of the disk drive tray 36 with fasteners 86 (FIG. 6), such as screws, with a baseplate 88 of the conduction unit 84 retained between the handle housing 58 and the front side 44. The air ventilation holes 46 in the front side 44 of the tray 36 are also aligned with comparable holes in the baseplate 88.

The conduction unit 84 is made of conductive material, such as stainless steel. Some portion of the EMI generated by the hard disk drives 22 is absorbed by the conductive material of the conduction unit 84 and converted to RF current, which reduces the amount of electromagnetic radiation that is emitted between adjacent neighboring disk drive carriers 20 in the disk storage shelf 24. The conduction unit 84 also mechanically and electrically contacts the conduction units 84 of the neighboring disk drive carriers 20 in the disk storage shelf 24, thereby establishing a common electrical reference among all of the metal components of each of the disk drive carriers within the disk storage shelf 24. The common electrical reference assists creating the electromagnetic shield that extends across the front of the disk drive carriers 20 in the disk storage shelf 24.

Figure 6:
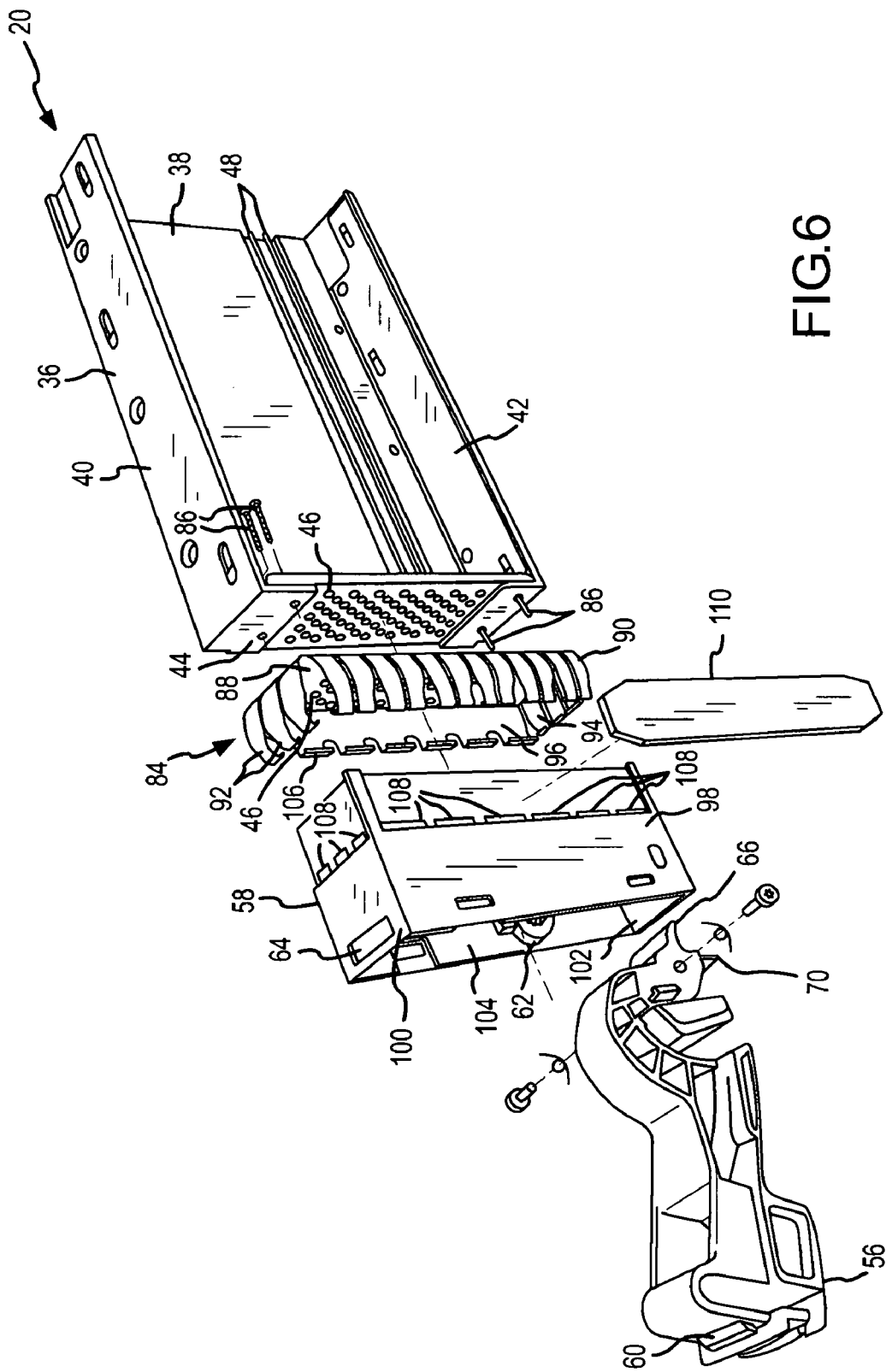
FIG. 6 is an exploded perspective view of the disk drive carrier shown in FIGS. 1-5.

Extending from the baseplate 88 are a plurality of individually-separate left-hand retaining side spring fingers 90 (viewed from the front of the disk drive carrier 20), a plurality of individually-separate top spring fingers 92, a plurality of individually-separate bottom spring fingers 94, and a single flat finger 96 (FIG. 6) on the opposite side from the retaining spring fingers 90 (i.e., on the left-hand side of the disk drive carrier 20 when viewed from the front). The fingers 90, 92, 94, and 96 are integrally connected to the baseplate 88 (FIG. 6).

The fingers 90, 92, 94 and 96 of the conduction unit 84 extend forward and outward over sides 98, 100, 102 and 104 of the handle housing 58. Curved tips 106 (FIG. 6) on the forward ends of the fingers 90, 92, 94, and 96 fit onto notches 108 (FIG. 6) in the sides 98, 100, 102 and 104 of the handle housing 58. The fingers 90, 92 and 94 arch above the lateral sides 98, 100 and 102 of the handle housing 58. The flat finger 96 is flat against lateral side 104 of the handle housing 58.

Figure 7:
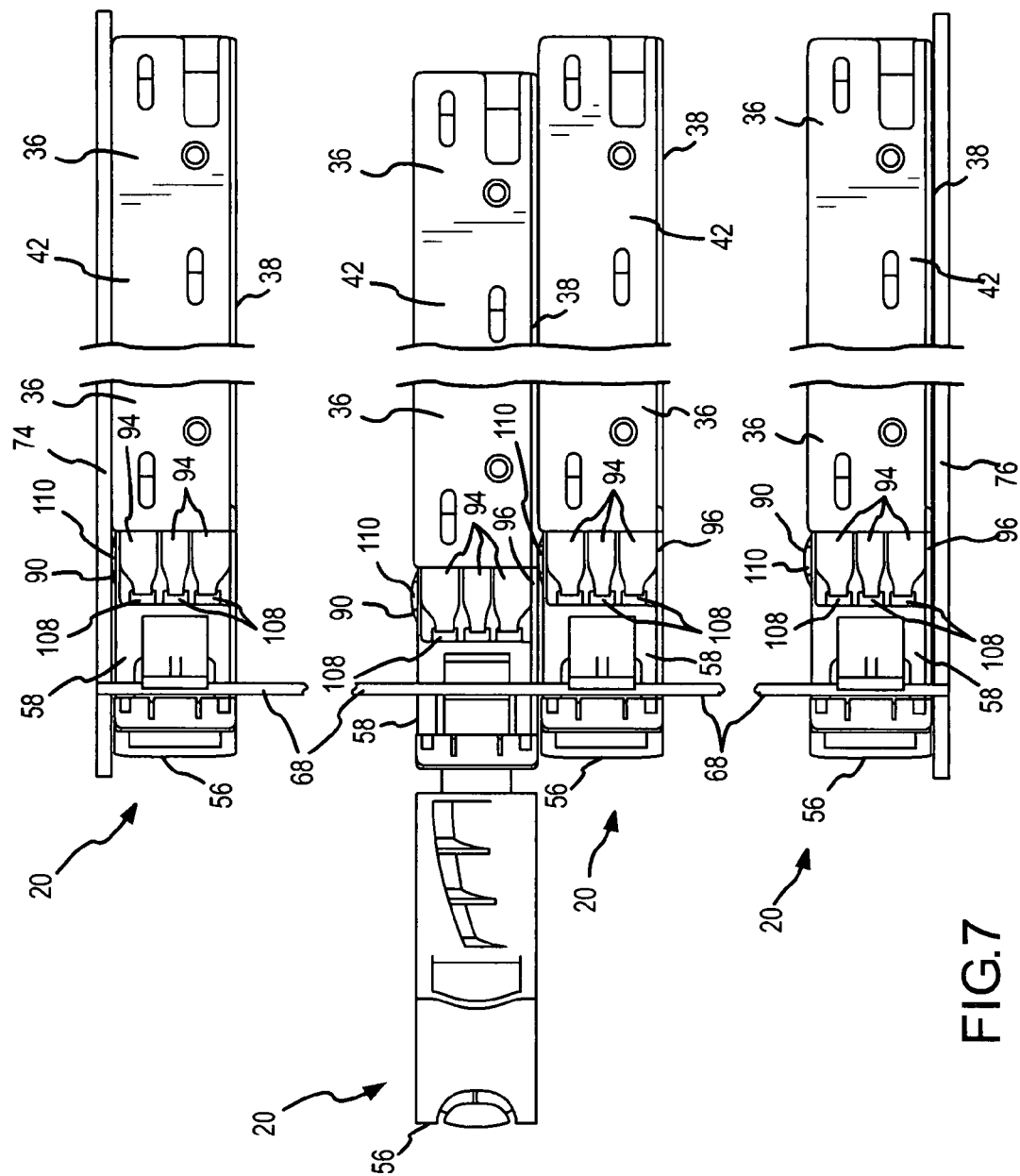
FIG. 7 is a partial horizontal cross-sectional view of the disk storage shelf shown in FIG. 2, taken substantially in the plane of line 7-7 in FIG. 2, illustrating in a bottom plan view the interaction of certain disk drive carriers with a portion of the disk storage shelf to secure and release the disk drive carriers.
Figure 8:
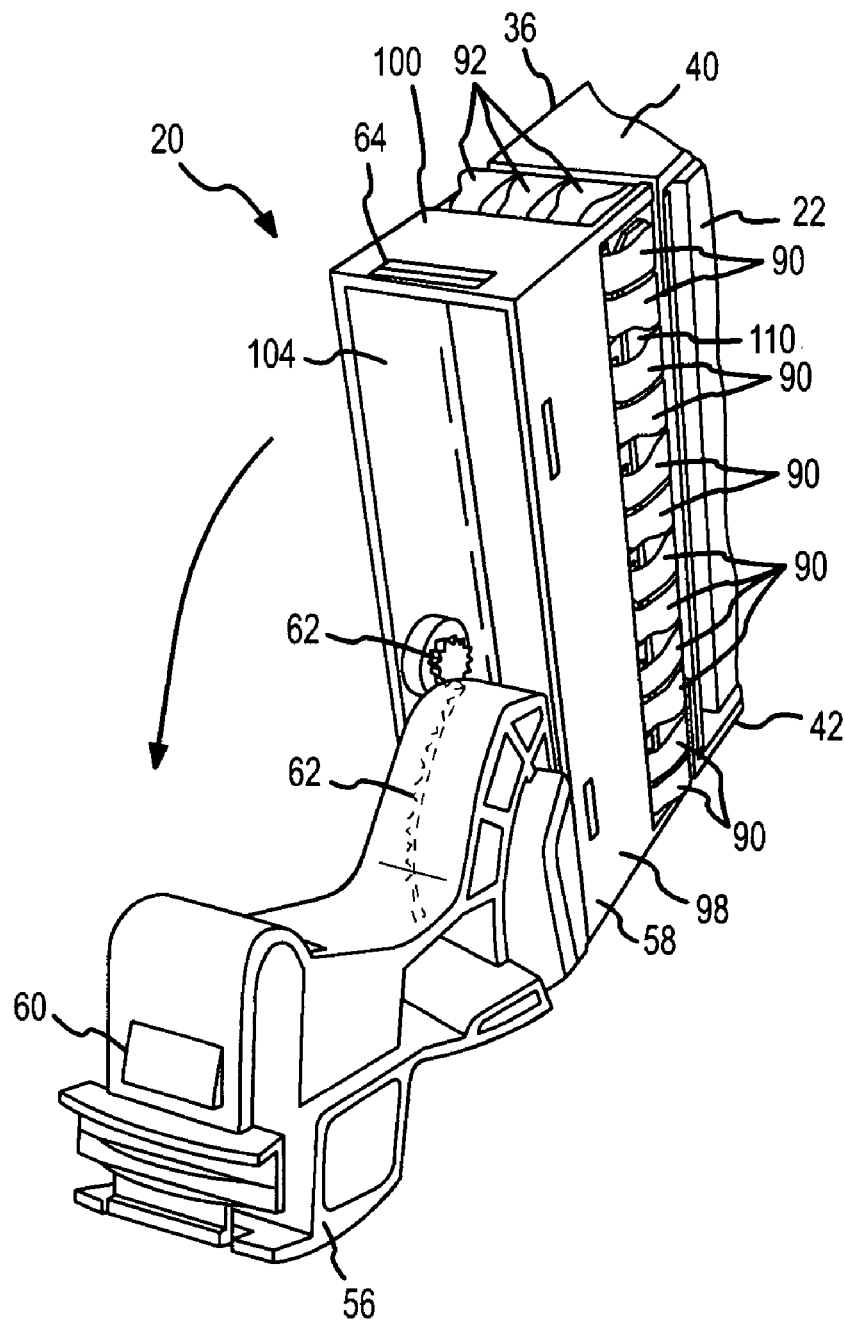
FIG. 8 is enlarged partial perspective view showing a front or outer portion of the disk drive carrier shown in FIGS. 1-7.

With the disk drive carriers 20 retained within the disk storage shelf 24, the retaining spring fingers 90 of each disk drive carrier 20 resiliently contact the flat finger 96 of its right-hand neighboring disk drive carrier 20 in the disk storage shelf 24, as shown in FIG. 7, and the flat finger 96 resiliently contacts the retaining spring fingers 90 of the left-hand neighboring disk drive carrier 20 in the disk storage shelf 24. The top spring fingers 92 resiliently contact the top side 78 of the disk storage shelf 24, and the bottom spring fingers 94 contact the bottom side 80 of the disk storage shelf 24.

The contacting relationship of the conductive fingers 90-96 with the conductive fingers of the adjoining disk drive carriers and the sides of the disk storage shelf 24 assists in creating a Faraday cage which extends across the spaces between adjacent disk drive carriers in the disk storage shelf, thereby attenuating some portion of the emission of electromagnetic radiation from the disk storage shelf 24. The Faraday cage thus created attenuates some of the high-frequency radiation emitted from the hard disk drives within the disk drive carriers. In this manner, the trays 36 of each of the disk drive carriers 20 and the metal walls 74-82 of the housing 72 of the disk drive shelf 24 and the conduction units 84 with their fingers 90-96 create an EMI shield around all of the hard disk drives within the disk drive shelf 24, to inhibit and substantially attenuate the emission of electromagnetic radiation from the collection of hard disk drives 22.

Prior to the present invention, the handle housing 58 and fingers 90-96 were formed of a conductive metal material which incorporated beryllium and copper and provided superior conductivity. A low contact impedance existed between the fingers 90-96 and the handle housing 58, and a low contact impedance existed between the fingers 90 and 96 of adjoining disk drive carriers 20 which contacted each other. Each of these low contact impedances formed excellent conductive pathways for the RF current absorbed by the fingers 90-96 to dissipate into the metal handle housing 58. These conductive current pathways assured that a substantial portion of the EMI generated by the hard disk drives 22 was converted into RF current, and the RF current was dissipated through the low resistance base metal housing, thereby dissipating and containing the emitted EMI within the Faraday cage. The conductive metal material of the handle housing 58 aided in creating the electromagnetic or EMI shield along the front of the disk drive carriers 20 by providing a low impedance pathway and contact for the RF current induced in the fingers 90, 92, 94 and 96 by the EMI.

To reduce the cost of manufacturing, in the present invention the handle 56 and the handle housing 58 are formed of non-electrically conductive plastic material and the fingers 90-96 are made of less-conductive stainless steel. In the absence of the metal-based housing 58 and the more-conductive fingers 90-96, the contact or transfer impedance between the fingers 90-96 with the plastic handle housing 58 and between the fingers 90 and 96 of the adjoining disk drive carriers 20 is so large that the RF current associated with the conduction unit 84 cannot be adequately dissipated. Consequently, some of the high-frequency radiation leaks through and between the spring fingers, or between the spring fingers and adjoining disk drive carriers. Without an ability to suppress the RF energy that is induced by the EMI in the conduction unit due to the high impedance with the plastic handle housing 58, there is an inadequate capability to absorb EMI and reduce its intensity sufficiently to meet governmental regulatory levels for high-frequency electromagnetic radiation. The plastic handle housing 58 is incapable of conducting or absorbing the high-frequency EMI energy emitted from the hard disk drive 22 along the front of the disk storage shelf.

Figure 9:
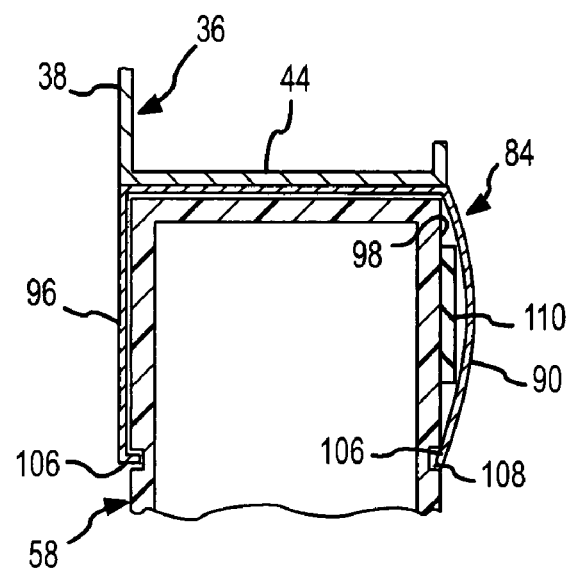
FIG. 9 is an enlarged partial cross-sectional view of the disk drive carrier shown in FIG. 4, taken substantially in the plane of line 9-9.

The present invention has resulted from the discovery that adequate EMI and electromagnetic radiation suppression, sufficient to meet or exceed the governmental regulation requirements, is obtained by the use of a high-frequency energy absorbing member 110 when inserted between the arched retaining spring fingers 90 and the side 98 of the non-conductive handle housing 58, as shown generally in FIGS. 1, 4-6, 8 and more specifically in FIG. 9. The high-frequency energy absorbing member 110 comprises a layer or strip of high-frequency energy absorbing material, such as silicon ferrite. The energy absorbing member 110 is retained beneath the arched retaining spring fingers 90, in front of the location where the spring fingers 90 attached to the baseplate 88, and behind the location where the curved tips 106 of the spring fingers 90 fit into the notches 108 formed in the side 98 of the handle housing 58. The retaining spring fingers 90 apply a force against the high-frequency energy absorbing member 110 to secure it against the side 98 of the handle housing 58.

When high-frequency radiation interacts with the conduction unit 84, the energy from the high-frequency radiation is converted to a RF current in the fingers 90-96. The RF energy is absorbed by the energy absorbing member 110 and converted to heat. The dissipation of the RF energy in the energy absorbing member 110 as heat reduces the amount of electromagnetic radiation that escapes from the disk storage shelf 24 to a level which is acceptable under governmental regulations, even when the handle 56 and the handle housing 58 are formed from non-electrically conductive material such as plastic.

If desired, shorter strips of the energy absorbing member 110 may be included beneath the top and bottom resilient spring fingers 92 and 94, to further assist in reducing the emitted amount of electromagnetic radiation at those locations.

Figure 10:
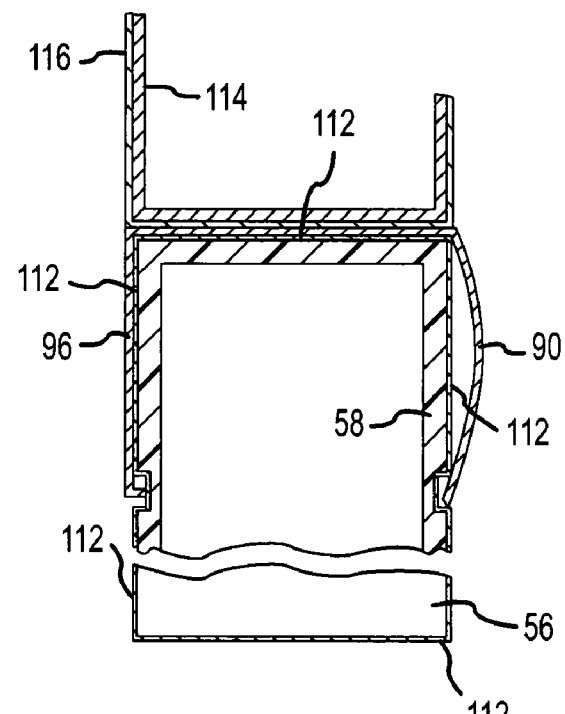
FIG. 10 is an enlarged partial cross-sectional view of the disk drive carrier similar to FIG. 9 which shows a layer of metal on a handle and handle housing of the disk drive carrier.

As an alternative to the high-frequency energy absorbing member 110, a layer of nickel-zinc 112 or other metal or highly conductive material may be sprayed or otherwise coated over the handle housing 58, as shown in FIG. 10. The layer of nickel-zinc 112 or other highly conductive material has a higher electrical conductivity than that of the stainless steel fingers 90-96, thereby significantly decreasing the contact impedance between the conductive fingers 90-96 and the coated plastic handle housing 58. The layer of nickel-zinc 112 or other metal sufficiently dissipates the RF current to reduce the amount of electromagnetic radiation emitted from the disk drive carrier 20, to a level which meets government regulations while permitting the handle 56 and the handle housing 58 to be formed from non-electrically conductive material such as plastic.

As a further embodiment and/or alternative, the other metallic components of the disk drive carrier 20 (FIGS. 1-9), such as the metallic tray 36, can be manufactured from a plastic or other non-conductive material and then coated with a layer of highly electrically conductive material. Such a non-metallic tray 114 shown in FIG. 10 is incapable of absorbing the EMI generated by the hard disk drive 22. A layer 116 of nickel-zinc or other highly conductive material is sprayed or otherwise coated over the exterior surfaces of the non-metallic tray 114. The application of the layer 116 of nickel-zinc over the non-metallic tray 114 prevents the escape of undesirable EMI in a similar fashion as the metallic tray 36 (FIGS. 4-9) prevents the escape of undesirable EMI.

The present invention allows for the manufacturer of reduced cost disk drive carriers by using less expensive materials without sacrificing quality or performance and while still achieving governmental regulations pertaining to the amount of emitted electromagnetic radiation or EMI. The high frequency energy absorbing member 110 or layers of nickel-zinc or other energy absorbing metal located as described herein successfully attenuates the high-frequency electromagnetic radiation emitted from hard disk drives to the point where nonmetallic handles and handle housings can be used while still obtaining the desired level of EMI suppression.

The significance of these and other improvements and advantages will become apparent upon gaining a full appreciation of the ramifications and improvements of the present invention. A preferred embodiment of the invention and many of its improvements have been described with a degree of particularity. The description is of a preferred example of implementing the invention, and the detailed description is not necessarily intended to limit the scope of the invention. The scope of the invention is defined by the following claims.

The invention claimed:

1. A disk drive carrier which houses a hard disk drive and which has improved shielding for electromagnetic interference (EMI) emitted by the hard disk drive, comprising:

a disk drive tray which receives the hard disk drive within the disk drive carrier, the disk drive tray comprising a non-conductive material and a layer of conductive material attached to the disk drive tray to shield a portion of the EMI emitted by the hard disk drive;

a handle and a handle housing connected to a front side of the disk drive tray, the handle pivotally connected to the handle housing for moving the disk drive carrier into and out of a position in which the disk drive carrier is normally retained during use, the handle and the handle housing formed substantially of material which is substantially incapable of absorbing electromagnetic radiation; and a high-frequency energy absorbing member located at the handle housing, the high-frequency energy absorbing member absorbing EMI emitted at the handle housing.

2. A disk drive carrier as defined in claim 1, wherein the high-frequency energy absorbing member comprises radiation-absorbing material attached to the handle housing.

3. A disk drive carrier as defined in claim 2, wherein the radiation-absorbing material is attached to a lateral side of the handle housing.

4. A disk drive carrier as defined in claim 1, further comprising:
a conduction unit connected to the front side of the disk drive tray for connecting the disk drive trays of adjacent disk drive carriers when in use positions adjacent to one another, the conduction unit including a plurality of fingers which extend forward from the disk drive tray and arch over at least one lateral side of the handle housing; and wherein:
the high-frequency energy absorbing member comprises radiation-absorbing material positioned between the plurality of fingers and a lateral side of the handle housing over which the fingers arch.

5. A disk drive carrier as defined in claim 4, wherein the high-frequency energy absorbing member comprises a strip of silicon ferrite.

6. A disk drive carrier as defined in claim 4, wherein the high-frequency energy absorbing member comprises a layer of metal attached to the handle housing.

7. A disk drive carrier as defined in claim 6, wherein the metal is a nickel-zinc alloy.

8. A disk drive carrier as defined in claim 4, wherein the high-frequency energy absorbing member comprises a layer of metal attached to the handle.

9. A disk drive carrier as defined in claim 8, wherein the metal of the layer is a nickel-zinc alloy.

10. A disk drive carrier as defined in claim 1, wherein the layer of conductive material is a nickel-zinc alloy.

11. A disk drive carrier as defined in claim 1, wherein the high-frequency energy absorbing member comprises silicon ferrite.

12. A disk drive carrier as defined in claim 1, wherein the high-frequency energy absorbing member comprises nickel-zinc alloy.

13. A method of reducing electromagnetic interference (EMI) emitted from hard disk drives housed within disk drive carriers in use positions on a disk storage shelf, comprising:
using the disk drive carriers each of which has a disk drive tray for housing a hard disk drive, a handle housing connected to a front side of the disk drive tray, a handle pivotally connected to the handle housing for moving the disk drive carrier into and out of a position in which the disk drive carrier is normally retained during use on the disk storage shelf, the handle housing formed substantially of material which is substantially incapable of absorbing electromagnetic radiation;
locating a high-frequency energy absorbing member at the handle housing to absorb the EMI emitted from the disk drive at the handle and handle housing; and wherein:
the disk drive tray comprises a non-conductive material, and a layer of conductive material is attached to the disk drive tray to shield a portion of the EMI emitted by the hard disk drive.

14. A method as defined in claim 13, wherein the high-frequency energy absorbing member comprises radiation-absorbing material attached to the handle housing.

15. A method as defined in claim 14, wherein the radiation-absorbing material is attached to a lateral side of the handle housing.

16. A method as defined in claim 13, wherein the high-frequency energy absorbing member comprises radiation-absorbing material, further comprising:
using a disk drive carrier which further includes a conduction unit connected to the front side of the disk drive tray for connecting the disk drive trays of adjacent disk drive carriers in the disk storage shelf in use positions adjacent to one another, the conduction unit including a plurality of fingers which extend forward from the disk drive tray and arch over at least one lateral side of the handle housing; and
locating the radiation-absorbing material between the plurality of fingers and a lateral side of the handle housing over which the fingers arch.

17. A method as defined in claim 16, wherein the high-frequency energy absorbing member comprises a strip of silicon ferrite.

18. A method as defined in claim 16, wherein the high-frequency energy absorbing member comprises a layer of metal attached to the handle housing.

19. A method as defined in claim 18, wherein the metal is a nickel-zinc alloy.

20. A method as defined in claim 16, wherein the high-frequency energy absorbing member comprises a layer of metal attached to the handle.

21. A method as defined in claim 20, wherein the metal is a nickel-zinc alloy.

22. A method as defined in claim 13, wherein the layer of conductive material is a nickel-zinc alloy.

23. A method as defined in claim 13, wherein the high-frequency energy absorbing member comprises silicon ferrite.

24. A method as defined in claim 13, wherein the high-frequency energy absorbing member comprises nickel-zinc alloy.

25. A method as defined in claim 13, further comprising:
filling the use positions of the disk storage shelf with disk drive carriers without regard to whether hard disk drives are housed in the disk drive trays of those carriers.

\* \* \* \* \*